US009223724B2

(12) United States Patent
Kondo et al.

(10) Patent No.: US 9,223,724 B2
(45) Date of Patent: Dec. 29, 2015

(54) INFORMATION PROCESSING DEVICE

(71) Applicant: KABUSHIKI KAISHA TOSHIBA, Minato-ku (JP)

(72) Inventors: Nobuhiro Kondo, Yokohama (JP); Konosuke Watanabe, Cambridge, MA (US); Kenichi Maeda, Kamakura (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/162,213

(22) Filed: Jan. 23, 2014

(65) Prior Publication Data

US 2015/0074329 A1 Mar. 12, 2015

Related U.S. Application Data

(60) Provisional application No. 61/875,515, filed on Sep. 9, 2013.

(51) Int. Cl.
| | |
|---|---|
| *G06F 3/00* | (2006.01) |
| *G06F 11/30* | (2006.01) |
| *G06F 12/14* | (2006.01) |
| *G06F 12/02* | (2006.01) |
| *G06F 12/08* | (2006.01) |

(52) U.S. Cl.
CPC ........ *G06F 12/1408* (2013.01); *G06F 12/0246* (2013.01); *G06F 12/0866* (2013.01); *G06F 2212/1016* (2013.01); *G06F 2212/311* (2013.01); *G06F 2212/461* (2013.01); *G06F 2212/466* (2013.01); *G06F 2212/468* (2013.01); *G06F 2212/7201* (2013.01); *G06F 2212/7207* (2013.01)

(58) Field of Classification Search
CPC ......... G06F 21/00; H04L 9/3234; H04L 9/00; H04N 21/42646
See application file for complete search history.

(56) References Cited

U.S. PATENT DOCUMENTS

| | | | |
|---|---|---|---|
| 7,065,651 B2 | 6/2006 | Evans | |
| 7,283,631 B2 | 10/2007 | Torii et al. | |
| 2005/0125619 A1 | 6/2005 | Evans | |
| 2005/0152547 A1 | 7/2005 | Evans | |
| 2005/0154902 A1 | 7/2005 | Evans | |
| 2005/0154903 A1 | 7/2005 | Evans | |
| 2005/0160285 A1 | 7/2005 | Evans | |
| 2005/0166042 A1 | 7/2005 | Evans | |

(Continued)

FOREIGN PATENT DOCUMENTS

| | | |
|---|---|---|
| JP | 2002-366437 | 12/2002 |
| JP | 2003-289500 | 10/2003 |
| JP | 2008-77366 | 4/2008 |

*Primary Examiner* — Hyun Nam
(74) *Attorney, Agent, or Firm* — Oblon, McClelland, Maier & Neustadt, L.L.P.

(57) ABSTRACT

A device of one embodiment includes a host device including a first memory unit and host controller, and memory device. The host controller controls input/output accesses to the first memory unit. The memory device includes a nonvolatile semiconductor memory, second memory unit, protection circuit, and device controller. The second memory unit temporarily stores data to be transferred between the first memory unit and the nonvolatile semiconductor memory. The protection circuit protects data to be transferred from the second memory unit to the first memory unit by converting the data into an incomprehensible format. The device controller switches according to a control program whether or not to protect the data by the protection circuit.

20 Claims, 18 Drawing Sheets

(56) References Cited

U.S. PATENT DOCUMENTS

| | | |
|---|---|---|
| 2008/0126813 A1 | 5/2008 | Kawakami |
| 2009/0182965 A1 * | 7/2009 | Norman ........................ 711/163 |
| 2010/0185843 A1 * | 7/2010 | Olarig et al. ...................... 713/2 |
| 2013/0339750 A1 * | 12/2013 | Amit et al. .................... 713/189 |

* cited by examiner

| Access UM Buffer | | | | | | | |
|---|---|---|---|---|---|---|---|
| xx00 1001b | (Flags) | Reserved | Reserved | UM ID | | | |
| Reserved | Reserved | Target UM Area Offset | Target UM Area Offset | Reserved | | | |
| Target UM Area Offset (MSB) | Target UM Area Offset | Data Length | Data Length | Target UM Area Offset (LSB) | | | |
| Data Length (MSB) | Data Length | | | Data Length (LSB) | | | |

F I G. 9

| Flag | Description |
|---|---|
| Flags.R | The .R flag shall be set to "1" for read (host -> device) operation. |
| Flags.W | The .W flag shall be set to "1" for write (device -> host) operation. |
| Flags.P | The .P flag shall be set to "1" to request subsequent UM DATA IN/OUT UPIU in TC 1. |

F I G. 10

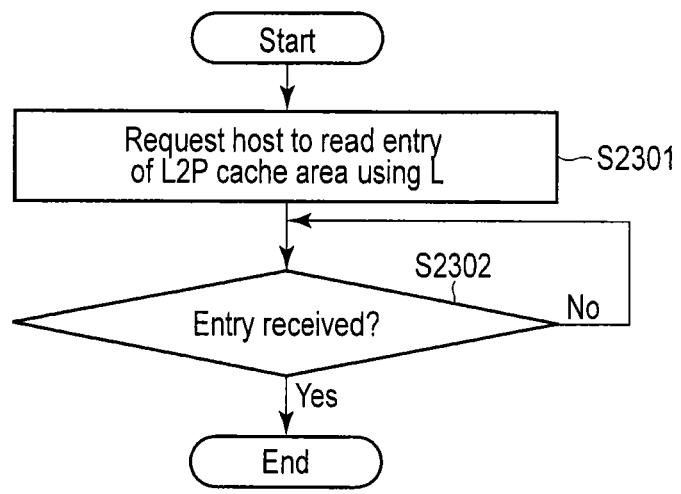
F I G. 17
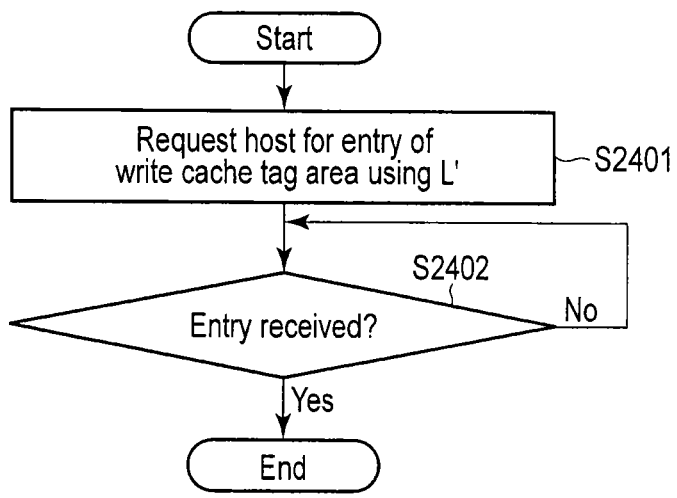
F I G. 18

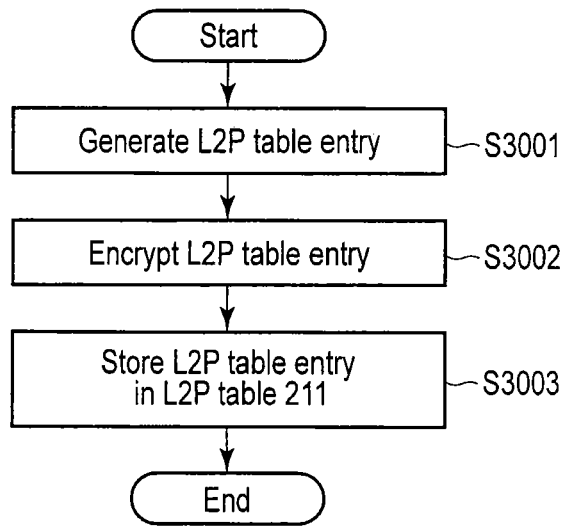
F I G. 23
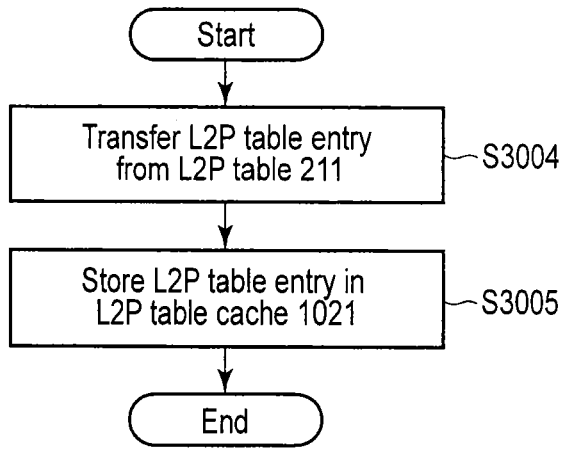
F I G. 24

INFORMATION PROCESSING DEVICE

CROSS-REFERENCE TO RELATED APPLICATIONS

This application claims the benefit of U.S. Provisional Application No. 61/875,515, filed Sep. 9, 2013, the entire contents of which are incorporated herein by reference.

FIELD

Embodiments described herein relate generally to an information processing device.

BACKGROUND

In, for example, a GPU (Graphical Processing Unit), a technique called a UMA (Unified Memory Architecture) for sharing one memory between a plurality of arithmetic processors is known.

BRIEF DESCRIPTION OF THE DRAWINGS

FIG. 9 is a view showing an example of the format of a data transfer command according to the first embodiment;

FIG. 10 is a table showing an example of flags included in the data transfer command according to the first embodiment;

FIG. 17 is a flowchart showing processing executed when the device controller refers to the L2P cache area;

FIG. 18 is a flowchart showing processing executed when the device controller reads an entry of the write cache tag area;

FIGS. 23, 24, and 25 are flowcharts showing operations of the information processing device according to the second embodiment.

DETAILED DESCRIPTION

Figure 1:
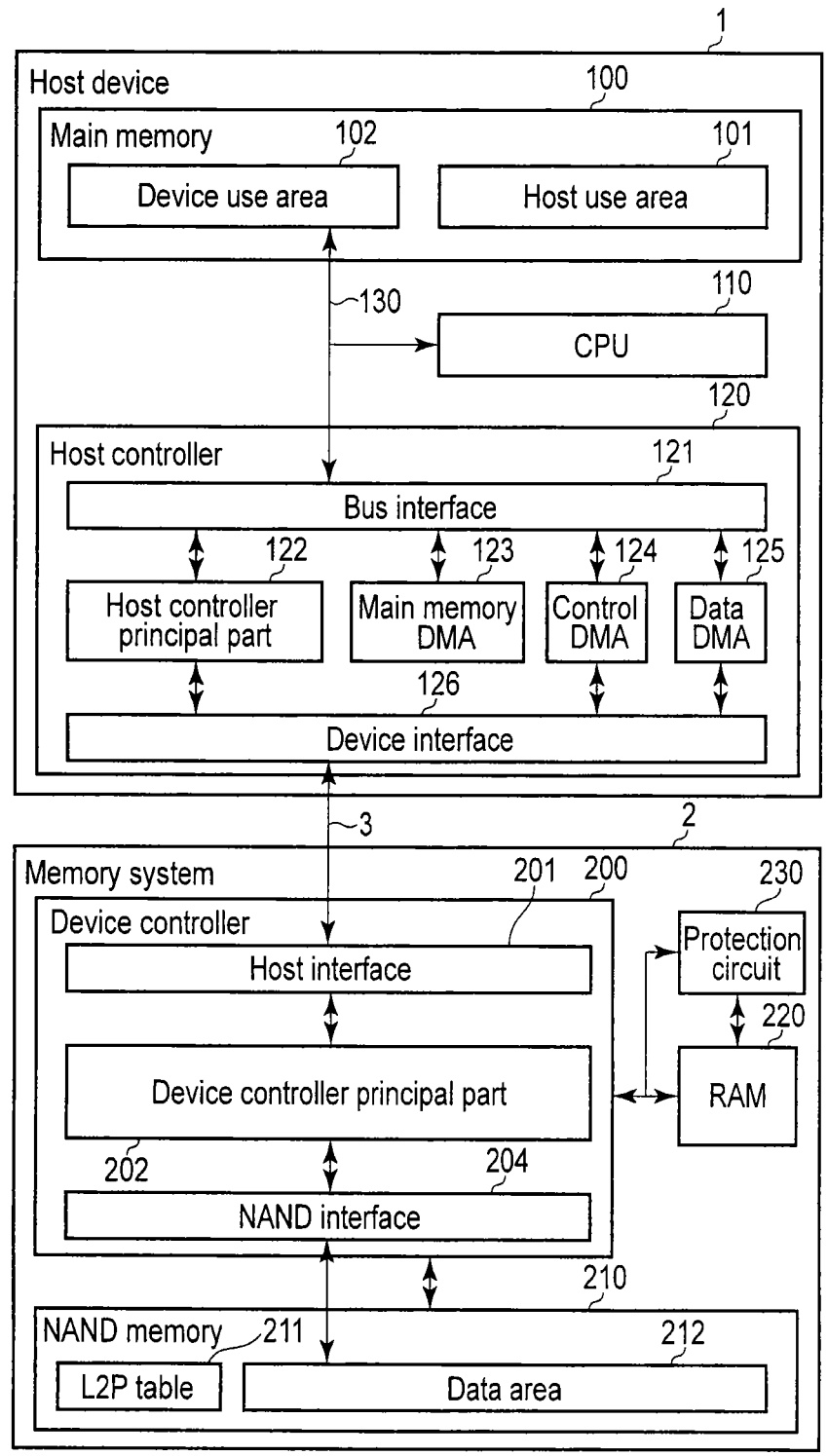
FIG. 1 is a block diagram showing a basic arrangement of an information processing device according to a first embodiment.

Embodiments will be described hereinafter with reference to the drawing. In the following description, the same reference numerals denote components having nearly the same functions and arrangements, and a repetitive description thereof will be given if necessary. Also, embodiments to be described hereinafter exemplify an apparatus and method required to embody the technical ideal of the embodiments, and do not limit materials, shapes, structures, layouts, and the like of components to those described hereinafter. The technical idea of the embodiments can be variously changed in the scope of the claims.

In general, according to one embodiment, an information processing device includes a host device and memory device. The host device includes a first memory unit and host controller. The first memory unit stores data. The host controller controls data input/output accesses of data to the first memory unit. The memory device includes a nonvolatile semiconductor memory, second memory unit, protection circuit, and device controller. The nonvolatile semiconductor memory stores data. The second memory unit temporarily stores data to be transferred between the first memory unit and the nonvolatile semiconductor memory. The protection circuit protects data to be transferred from the second memory unit to the first memory unit by converting the data into an incomprehensible format for a third party, and restores protected data on the first memory unit to a comprehensible format for the third party when the protected data is transferred to the second memory unit. The device controller switches according to a control program whether or not to protect the data by the protection circuit.

First Embodiment

FIG. 1 is a block diagram schematically showing a basic arrangement of an information processing device according to a first embodiment.

An information processing device of the first embodiment includes a host device 1 and a memory system (memory device) 2 which functions as a storage device of the host device 1.

The host device 1 and memory system 2 are connected via a communication path 3. To the memory system 2, a flash memory for an embedded application, which is compliant with a UFS (Universal Flash Storage) standard, SSD (Solid State Drive), or the like is applicable. The information processing device is, for example, a personal computer, mobile phone, image capturing device, or the like. As a communication standard of the communication path 3, for example, MIPI (Mobile Industry Processor Interface) M-PHY and UniPro is adopted.

<Overview of Memory System>

The memory system 2 includes a nonvolatile semiconductor memory, for example, a NAND flash memory 210, a device controller 200, a RAM (Random Access Memory) 220, and a protection circuit 230.

The NAND flash memory (to be referred to as "NAND memory" hereinafter) 210 is configured by one or more memory chips each including a memory cell array. The memory cell array includes a plurality of blocks. Each block includes a plurality of nonvolatile memory cells arranged in a matrix, and is configured by a plurality of pages. Each page is a data read/write unit. Each nonvolatile memory cell is an electrically rewritable memory cell transistor, and has a floating gate electrode and control gate electrode.

The NAND memory 210 has a Logical-to-Physical (L2P) address conversion table (to be referred to as "L2P table" hereinafter) 211 and a data area 212.

The L2P table 211 is one of pieces of management information required for the memory system 2 to function as an external storage device for the host device 1. That is, the L2P table 211 includes address conversion information, which associates a logical block address (LBA) used when the host device 1 accesses the memory system 2 and a physical address (block address+page address+intra-page storage location) in the NAND memory 210 with each other. Note that the management information is information required for the memory system 2 to function as an external storage device for the host device 1, as described above.

A Logical-to-Physical (L2P) cache area 300 (to be described later) in the host device 1 caches a part of this L2P table 211. In order to distinguish the part of the L2P table 211 cached on the L2P cache area 300 and the L2P table 211 in the NAND memory 210 from each other, the part of the L2P table 211 will be described as an L2P table entry hereinafter.

The data area 212 stores data transmitted from the host device 1. Data stored in the data area 212 include, for example, an OS (Operating System program) required for the host device 1 to provide an execution environment, a user program executed by the host device 1 on the OS, data input/output by the OS or user program, and the like.

The device controller 200 controls data transfer between the memory system 2 and host device 1, and also controls an operation of the NAND memory 210. The device controller 200 includes a host interface 201 as a connection interface of the communication path 3, a NAND interface 204 as a connection interface between itself and the NAND memory 210, and a device controller principal part 202 which executes the control of the device controller 200.

The device controller principal part 202 controls data transfer between the host device 1, and the RAM 220 and protection circuit 230 via the host interface 201. The device controller principal part 202 controls data transfer between the RAM 220 and protection circuit 230, and the NAND memory 210 via the NAND interface 204.

Note that the device controller principal part 202 is configured by, for example, a microcomputer unit including an arithmetic device and storage device. The arithmetic device executes a control program, for example, firmware pre-stored in the storage device to implement functions as the device controller principal part 202. Note that the storage device may be removed from the device controller principal part 202, and firmware may be stored in the NAND memory 210. The device controller principal part 202 can be configured using an ASIC (Application Specific Integrated Circuit).

The RAM 220 includes a plurality of buffers which store data to be written in the NAND memory 210 or data read from the NAND memory 210. The RAM 220 is used as a command queue for queuing commands related to a write request, read request, and the like input from the host device 1. The RAM 220 can be configured by, for example, a small-scale SRAM (Static Random Access Memory), DRAM (Dynamic Random Access Memory), or the like. Alternatively, a register and the like may substitute a function of the RAM 220.

The protection circuit 230 protects data input/output to/from the RAM 220 according to a control program, for example, firmware which is stored in the device controller 200 or NAND memory 210. More specifically, the protection circuit 230 protects data to be output from the RAM 220 by converting the data into an incomprehensible format for a third party, and restores the protected data to a comprehensible format for the third party.

The memory system 2 of the first embodiment assumes the flash memory for the embedded application, which is compliant with the UFS (Universal Flash Storage) standard. For this reason, commands and the like to be described below follow the UFS standard.

<Overview of Host Device>

The host device 1 includes a main memory 100, host controller 120, and CPU 110. The CPU 110 executes an OS and a user program. The main memory 100, CPU 110, and host controller 120 are connected to each other via a bus 130.

The main memory 100 is configured by, for example, a DRAM. The main memory 100 includes a host use area 101 and device use area 102. The host use area 101 is used as a program expansion area when the host device 1 executes the OS and the user program, and a work area when the host device 1 executes the program expanded on the program expansion area.

The device use area 102 is used as a recording area of management information of the memory system 2 and a cache area for read/write accesses. As an example of the management information cached on the memory system 2, the L2P table 211 is taken. Also, assume that write data is cached on the device use area 102.

The host controller 120 includes a bus interface 121 as a connection interface of the bus 130, a device interface 126 as a connection interface of the communication path 3, and a host controller principal part 122.

The host controller principal part 122 controls transfer of data and commands between itself, and the main memory 100 and CPU 110 via the bus interface 121. The host controller principal part 122 controls transfer of data (including commands) between itself and the memory system 2 via the device interface 126.

The host controller 120 includes a main memory DMA 123, control DMA 124, and data DMA 125. The main memory DMA 123 executes DMA (Direct Memory Access) transfer between the host use area 101 and device use area 102. The control DMA 124 captures a command to be sent from the memory system 2 so as to access the device use area 102, and is used by the host controller principal part 122 to transmit status information associated with the device use area 102 to the memory system 2. The data DMA 125 executes DMA transfer with the device use area 102, and is used to exchange data between the memory system 2 and device use area 102.

The control DMA 124 is connected to the device interface 126, and can exchange commands and status information between itself and the memory system 2. Also, the data DMA 125 is connected to the device interface 126, and can exchange data between itself and the memory system 2.

Figure 2:
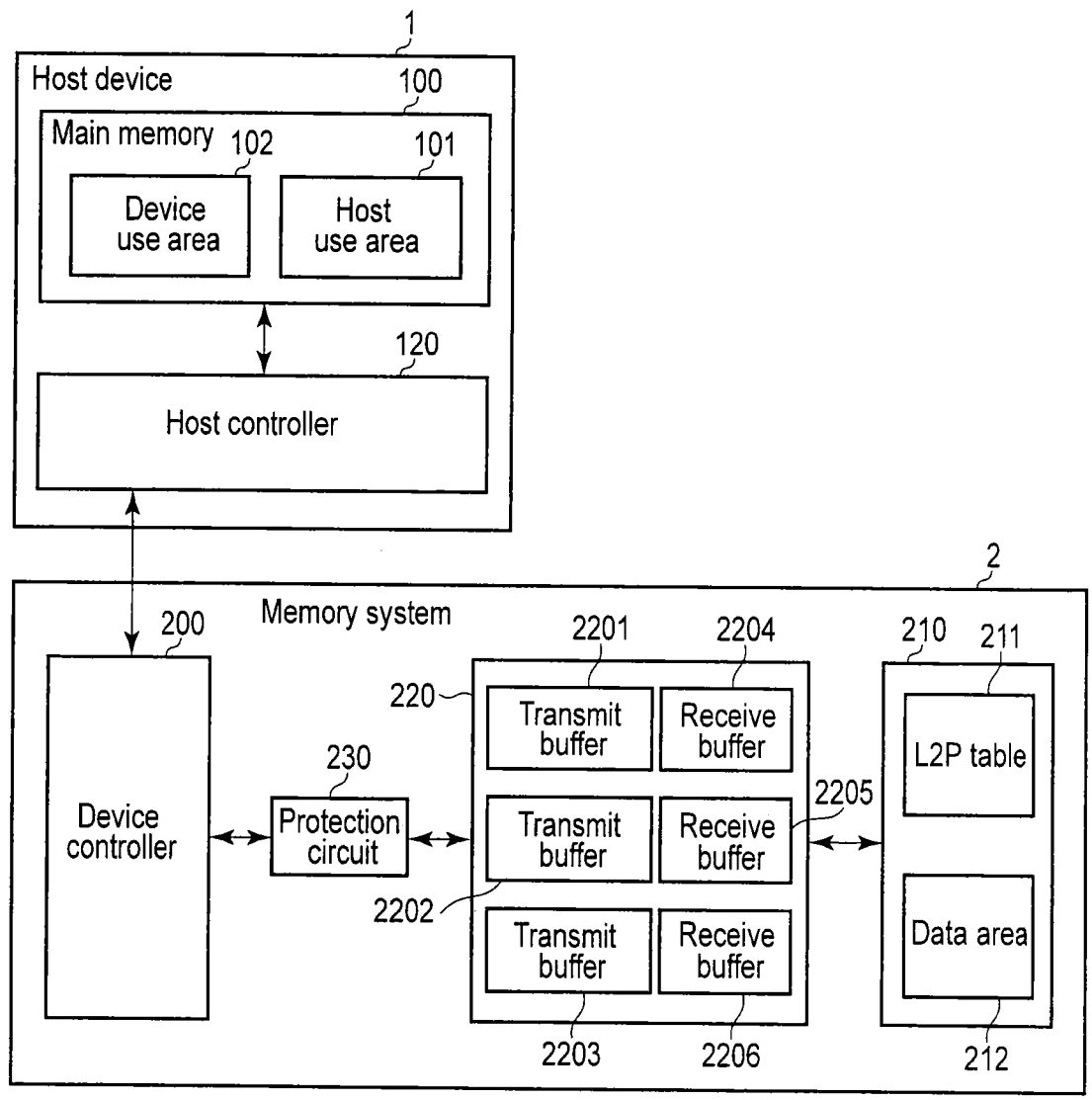
FIG. 2 is a block diagram showing a principal arrangement of the information processing device according to the first embodiment.

FIG. 2 is a block diagram showing a principal arrangement of the information processing device according to the first embodiment.

As shown in FIG. 2, the information processing device includes the host device 1 and memory system 2. The memory system 2 includes the nonvolatile semiconductor memory, for example, the NAND flash memory 210, device controller 200, RAM 220, and protection circuit 230.

The NAND memory 210 includes the L2P table 211 and data area 212. The L2P table 211 is a table which associates logical addresses and physical addresses with each other so as to convert logical addresses into physical addresses. The data area 212 stores information required to manage the host device 1 and memory system 2, and information used by the user.

The RAM 220 includes a plurality of transmit buffers 2201, 2202, and 2203, and a plurality of receive buffers 2204, 2205, and 2206. The transmit buffers respectively have different storage capacities. For example, the transmit buffer 2201 has a storage capacity of 32 bytes, the transmit buffer 2202 has a storage capacity of 512 bytes, and the transmit buffer 2203 has a storage capacity of 32 Kbytes. Also, the receive buffers respectively have different storage capacities. For example, the receive buffer 2204 has a storage capacity of 32 bytes, the receive buffer 2205 has a storage capacity of 512 bytes, and the receive buffer 2206 has a storage capacity of 32 Kbytes.

The protection circuit 230 encrypts data to be transferred from the memory system 2 to the host device 1. That is, the protection circuit 230 converts data to be transferred into an incomprehensible format for a third party. The protection circuit 230 receives encrypted data from the host device 1, and decrypts these data.

When data to be transferred from the memory system 2 to the host device 1 includes management information of the memory system 2, the device controller 200 controls the protection circuit 230 to encrypt the data, and outputs the encrypted data to the host device 1. On the other hand, when data to be transferred from the memory system 2 to the host device 1 is user data which does not include any management information of the memory system 2, the device controller 200 outputs the user data intact (for example, as plaintext data) to the host device 1 without encrypting the user data by the protection circuit 230. The user data is data which does not include the management information of the memory system 2, and is used by the user. When data to be transferred from the host device 1 to the memory system 2 includes management information of the memory system 2, or is encrypted data, the device controller 200 controls the protection circuit 230 to decrypt the data, and stores the decrypted data in the RAM 220. On the other hand, when data to be transferred from the host device 1 to the memory system 2 does not include any management information of the memory system 2 or is data which is not encrypted, the device controller 200 stores that data in the RAM 220 without decrypting the data by the protection circuit 230.

Note that the management information is information required for the memory system 2 to function as the external storage device for the host device 1, and is desirably protected when that information is stored in the device use area 102. On the other hand, the user data may often be updated in the main memory 100 of the host device 1, and cannot be easily updated if it is protected in such case. Hence, it is desirable not to protect the user data. Whether or not to encrypt data by the protection circuit 230 is controlled by the device controller 200 according to a control program such as firmware. For example, the device controller 200 switches whether or not to encrypt these data by the protection circuit 230 according to the storage capacities of the buffers in the RAM 220, which holds the data.

For example, whether or not to apply encryption processing is switched, so that data stored in the transmit buffer 2202 (buffer size=512 bytes) or transmit buffer 2203 (buffer size=32 Kbytes) is encrypted when it is transferred, and data stored in the transmit buffer 2201 (buffer size=32 bytes) is not encrypted when it is transferred.

Also, whether or not to apply decryption processing is switched, so that data to be stored in the receive buffer 2204 (buffer size=32 bytes) or receive buffer 2205 (buffer size=512 bytes) is to be decrypted, and data to be stored in the receive buffer 2206 (buffer size=32 Kbytes) is not to be decrypted.

Also, the device controller 200 switches whether or not to encrypt data by the protection circuit 230 according to a size of the data stored in each buffer. The device controller 200 switches whether or not to decrypt data by the protection circuit 230 according to a size of the data to be transferred from the main memory 100 to the RAM 220.

Alternatively, whether or not to encrypt data may be switched depending on types of the data to be transferred. For example, when data to be transferred is management information, the data is encrypted or decrypted by the protection circuit 230. When data to be transferred is user data, encryption or decryption processing by the protection circuit 230 is not executed.

The host device 1 includes the main memory 100 and host controller 120. The main memory 100 includes the host use area 101 and device use area 102. The device use area 102 is used as a storage area of the management information of the memory system 2 and a cache area for read/write accesses.

The host controller 120 controls the operation of the main memory 100, and also controls data transfer between itself and the memory system 2.

In the first embodiment, the plurality of transmit and receive buffers are included, whether or not to encrypt data is determined in advance for the respective transmit buffers, and whether or not to decrypt data is determined in advance for the respective receive buffers. Thus, the need for determination as to whether or not to apply encryption or decryption processing for the device controller 200 can be obviated, and a control load on the device controller 200 can be reduced.

<Overview of Device Use Area>

Figure 3:
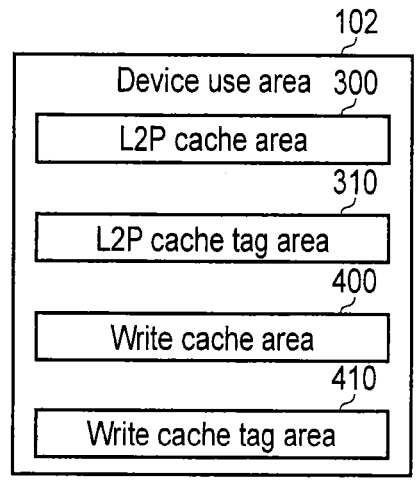
FIG. 3 is a view showing a memory structure of a device use area according to the first embodiment.

FIG. 3 shows a memory structure of the device use area 102.

As shown in FIG. 3, the device use area 102 includes an L2P cache area 300, L2P cache tag area 310, write cache area 400, and write cache tag area 410. The L2P cache area 300 caches a part of the L2P table 211 (L2P table entry). The L2P cache tag area 310 stores tag information used in hit/miss determination of the L2P table entry stored in the L2P cache area 300. The write cache area 400 is a memory area having a cache structure which buffers write data. The write cache tag area 410 stores tag information used in hit/miss determination of write data stored in the write cache area 400.

Of data exchanged between the memory system 2 and host device 1, data (for example, the user data) as data copy targets between the device use area 102 and host use area 101 in the main memory 100 of the host device 1 cannot be protection targets by the protection circuit 230, and other data (for example, the management information) can be protection targets. Therefore, the write cache area 400 is not protected by the protection circuit 230. On the other hand, the L2P cache area 300, L2P cache tag area 310, and write cache tag area 410 are protected by the protection circuit 230.

<Memory Structure of L2P Cache Tag Area>

Figure 4:
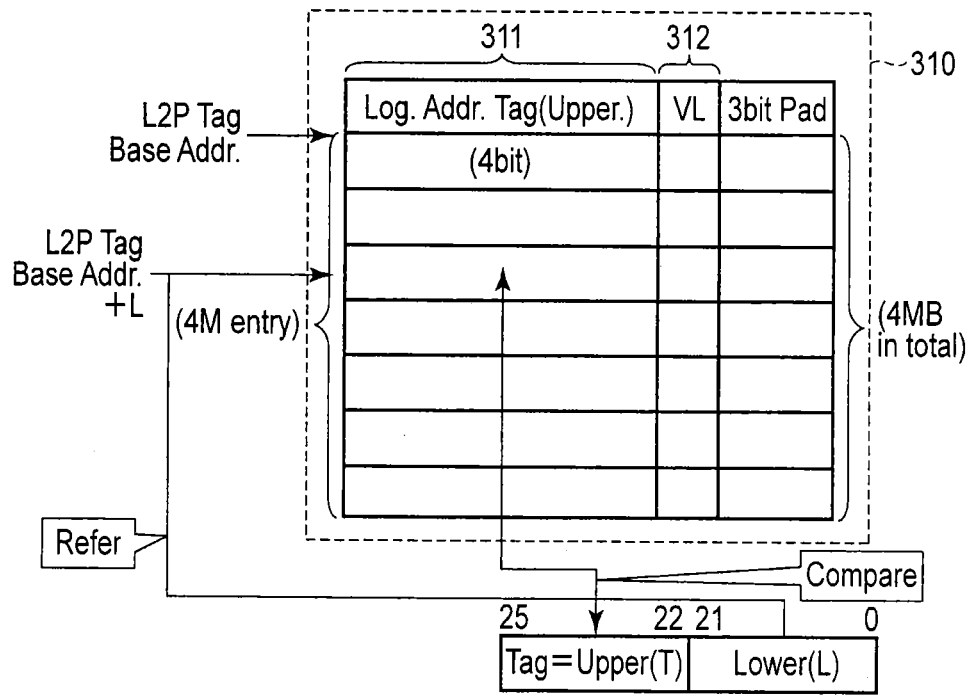
FIG. 4 is a view showing a memory structure of an L2P cache tag area in the device use area.
Figure 5:
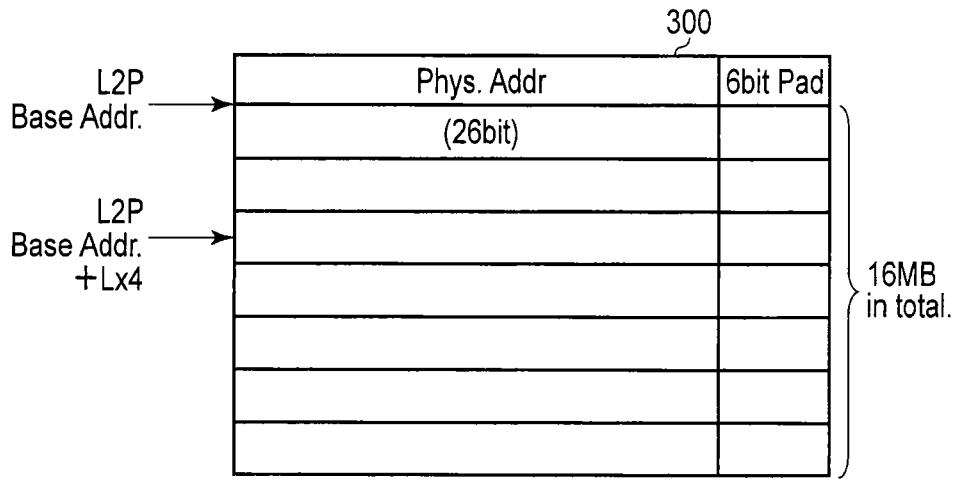
FIG. 5 is a view showing a memory structure of an L2P cache area in the device use area.

FIG. 4 shows a memory structure of the L2P cache tag area 310, and FIG. 5 shows a memory structure of the L2P cache area 300.

Assume that, for example, a logical block address (LBA) has a data length of 26 bits, and the L2P cache area 300 is referred to using a value of lower 22 bits of the LBA. In the following description, let T be a value of upper 4 bits of the LBA, and L be a value of the lower 22 bits. Assume that the LBA is allocated for each page (4 Kbytes in this case) which configures the NAND memory 210.

Each individual cache line which configures the L2P cache area 300 stores a physical address (Phys. Addr.) for one LBA, as shown in FIG. 5.

The L2P cache area 300 is configured by cache lines as many as the number obtained by raising 2 to the 22nd power. Each individual cache line has a sufficient storage capacity (for example, 4 bytes) required to store a 26-bit physical address. Therefore, the L2P cache area 300 has a total size obtained by multiplying $2^{22}$ by 4 bytes, that is, 16 Mbytes.

The L2P cache area 300 is configured to store physical addresses corresponding to LBAs in an order of L values. That is, each individual cache line which configures the L2P cache area 300 is invoked by referring to an address obtained by adding a page address (L2P Base Addr.) of the L2P cache area 300 to 4*L. Note that of each 4-byte cache line which configures the L2P cache area 300, a surplus area excluding an area which stores a 26-bit physical address is described as "Pad". In the subsequent tables, a surplus portion will also be described as "Pad".

As shown in FIG. 4, the L2P cache tag area 310 is configured to register values T as tag information for respective cache lines stored in the L2P cache area 300 in an order of L values. Each individual entry includes a field 311 which stores tag information, and a field 312 which stores a VL (Valid L2P) bit indicating a valid cache line or not.

Note that the L2P cache tag area 310 is configured so that T registered as tag information in the L2P cache tag area 310 matches upper digits T of an LBA corresponding to a physical address stored in a corresponding cache line (that is, a cache line referred to using L) of the L2P cache area 300. That is, whether or not a physical address corresponding to upper digits T of a desired LBA is cached on the L2P cache area 300 is determined by referring to an address obtained by adding a base address (L2P Tag Base Addr.) of the L2P cache tag area 310 to an L value which configures the desired LBA, and checking whether or not tag information stored at the referred location matches a T value which configures the desired LBA.

If the two values match, it is determined that the physical address corresponding to the desired LBA is cached; otherwise, it is determined that the physical address corresponding to the desired LBA is not cached. Note that since T is a 4-bit value and the VL bit requires a 1-bit size, each individual entry has a capacity of 1 byte. Therefore, the L2P cache tag area 310 has a size obtained by multiplying $2^{22}$ by 1 byte, that is, 4 Mbytes.

Figure 6:
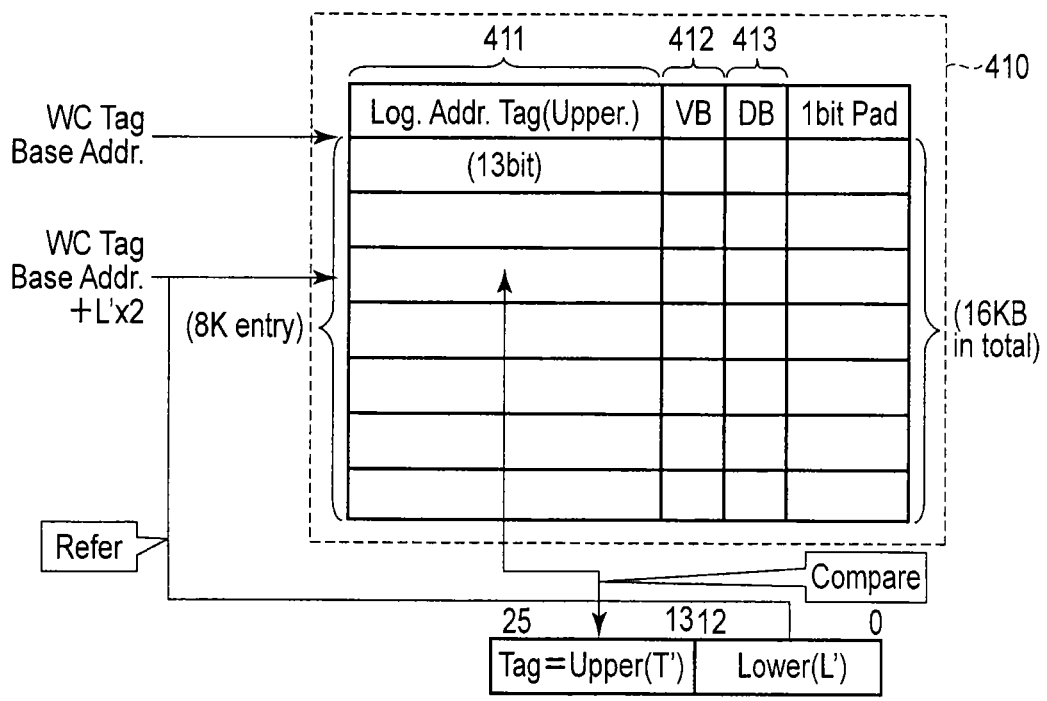
FIG. 6 is a view showing a memory structure of a write cache tag area in the device use area.
Figure 7:
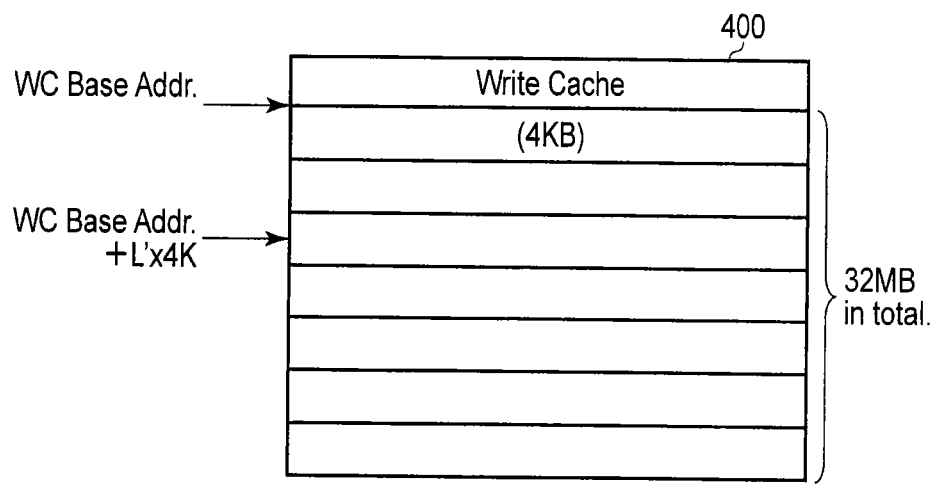
FIG. 7 is a view showing a memory structure of a write cache area in the device use area.

FIG. 6 shows a memory structure of the write cache tag area 410, and FIG. 7 shows a memory structure of the write cache area 400.

Assume that the write cache area 400 is referred to using a value of lower 13 bits of an LBA. In the following description, let T' be a value of upper 13 bits of an LBA, and L' be a value of lower 13 bits.

Each individual cache line which configure the write cache area 400 stores write data of a page size, as shown in FIG. 7.

The write cache area 400 is configured by cache lines as many as the number obtained by raising 2 to the 13th power. Since each cache line caches write data of a page size (4 Kbytes in this case), the write cache area 400 has a total size obtained by multiplying $2^{13}$ by 4 Kbytes, that is, 32 Mbytes.

Also, the write cache area 400 stores corresponding write data in an order of L' values. That is, each individual cache line which configures the write cache area 400 is read by referring to an address obtained by adding a page address (WC Base Addr.) of the write cache area 400 to L'*4K.

As shown in FIG. 6, the write cache tag area 410 is configured to register T' as tag information for each cache line stored in the write cache area 400 in an order of L'. Each individual entry has fields 411, 412, and 413. The field 411 stores tag information. The field 412 stores a VB (Valid Buffer) bit indicating a valid cache line or not. The field 413 stores a DB (Dirty Buffer) bit indicating whether cached write data is dirty or clean.

The write cache tag area 410 is configured so that T' registered as tag information in the write cache tag area 410 matches upper digits T' of an LBA allocated to a storage destination page of write data stored in a corresponding cache line (that is, a cache line referred to using L') of the write cache area 400. That is, whether or not write data corresponding to a desired LBA is cached in the write cache area 400 is determined as follows. That is, an address obtained by adding a base address (WC Tag Base Addr.) of the write cache tag area 410 to L'*2 value which configure upper digits T of the desired LBA is referred to, and whether or not tag information stored at the referred location matches a T' value which configures the desired LBA is checked.

Note that a cache line being dirty means a state in which write data stored in that cache line does not match data stored at a corresponding address on the NAND memory 210. On the other hand, a cache line being clean means a state in which the two data match. When a dirty cache line is written back to the NAND memory 210, that cache line becomes clean.

Note that since each individual tag information T' of the write cache tag area 410 has a data length of 13 bits, and each of the DB bit and VB bit requires a 1-bit size, each individual entry has a capacity of 2 bytes. Therefore, the write cache tag area 410 has a size obtained by multiplying $2^{13}$ by 2 bytes, that is, a size of 16 Kbytes.

The CPU 110 executes the OS and user program, and generates a write command for writing data in the host use area 101 in the memory system 2 based on a request from each of these programs. The generated write command is sent to the host controller 120.

<Overview of Data Structure of Write Command>

Figure 8:
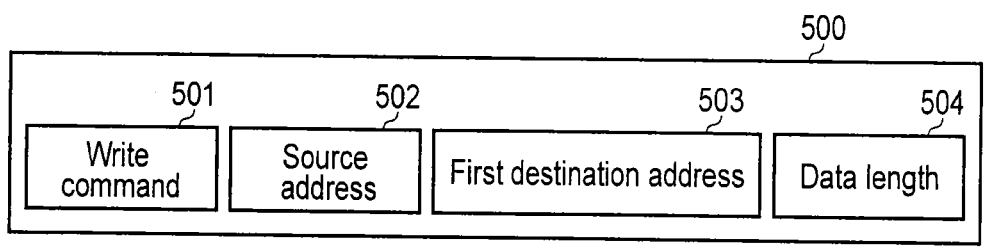
FIG. 8 is a view showing a data structure example of a write command according to the first embodiment.

FIG. 8 shows a data structure example of a write command.

As shown in FIG. 8, a write command 500 is configured to include a write instruction 501, source address 502, first destination address 503, and data length 504.

The write instruction 501 indicates that the write command 500 commands to write data. The source address 502 is an address in the host use area 101 at which write target data is stored. The first destination address 503 indicates a write destination address of write data, and is described by an LBA. The data length 504 indicates a data length of write data.

The host controller 120 receives the write command 500 sent from the CPU 110 via the bus interface 121. Furthermore, the host controller 120 reads the source address 502 and first destination address 503 included in the received write command 500. Then, the host controller 120 transfers the first destination address 503 and length 504 to the memory system 2 via the device interface 126.

Note that when the host controller 120 loads data stored at the source address 502, it may use the main memory DMA 123. In this case, the host controller 120 sets the source address 502, data length 504, and destination address at a buffer address in the host controller 120, and boots the main memory DMA 123.

Also, the host controller 120 can receive various commands from the CPU 110 in addition to the write command 500. In this case, the host controller 120 enqueues received commands in a command queue, and dequeues a processing target command in turn from the first command in the command queue. Note that an area for storing a data structure of this command queue may be assured in the main memory 100, or a small-scale memory and register may be arranged inside or in the vicinity of the host controller 120, and the data structure may be assured in them.

<Format of Command>

A format of a data transfer command according to the first embodiment will be described below with reference to FIG. 9. FIG. 9 shows an example of a format of a data transfer command according to the first embodiment.

As shown in FIG. 9, a data transfer command (Access UM Buffer) can include various kinds of information upon execution of data transfer with the host device 1. The data transfer command (Access UM Buffer) according to the first embodiment can especially include "Flags" information (refer to a portion bounded by the broken line in FIG. 9).

<Flags>

The Flags included in the data transfer command (Access UM Buffer) according to the first embodiment will be described below with reference to FIG. 10. FIG. 10 shows an example of the Flags included in the data transfer command (Access UM Buffer) according to the first embodiment.

As shown in FIG. 10, the Flags included in the data transfer command (Access UM Buffer) according to the first embodiment include three types of flags, that is, a flag R (Flags.R), flag W (Flags.W), and flag P (Flags.P). The memory system 2 sets these flags in the data transfer command (Access UM Buffer).

[Flag R (Flags.R)]

The flag R indicates that a subsequent operation is an operation for reading data from the device use area 102 of the host device 1 to the memory system 2.

More specifically, when a data read operation from the host device 1 to the memory system 2 is to be executed, "1" is set in the flag R.

[Flag W (Flags.W)]

The flag W indicates that a subsequent operation is an operation for writing data from the memory system 2 in the device use area 102 of the host device 1.

When a data write operation from the memory system 2 to the host device 1 is to be executed, "1" is set in the flag W.

[Flag P (Flags.P)]

The flag P is used to determine a priority of a subsequent data input sequence (UM DATA IN) from the memory system 2 to the host device 1 or a subsequent data output sequence (UM DATA OUT) from the host device 1 to the memory system 2.

More specifically, when the priority of the data input sequence (UM DATA IN) from the memory system 2 to the host device 1 or the data output sequence (UM DATA OUT) from the host device 1 to the memory system 2 is set to be "high", "1" is set in the flag P.

When the priority of the data input sequence (UM DATA IN) from the memory system 2 to the host device 1 or the data output sequence (UM DATA OUT) from the host device 1 to the memory system 2 is set to be "low", "0" is set in the flag P. Note that in this embodiment, a description related to the priority using the flag P will not be given.

<Write Operation>

Figure 11:
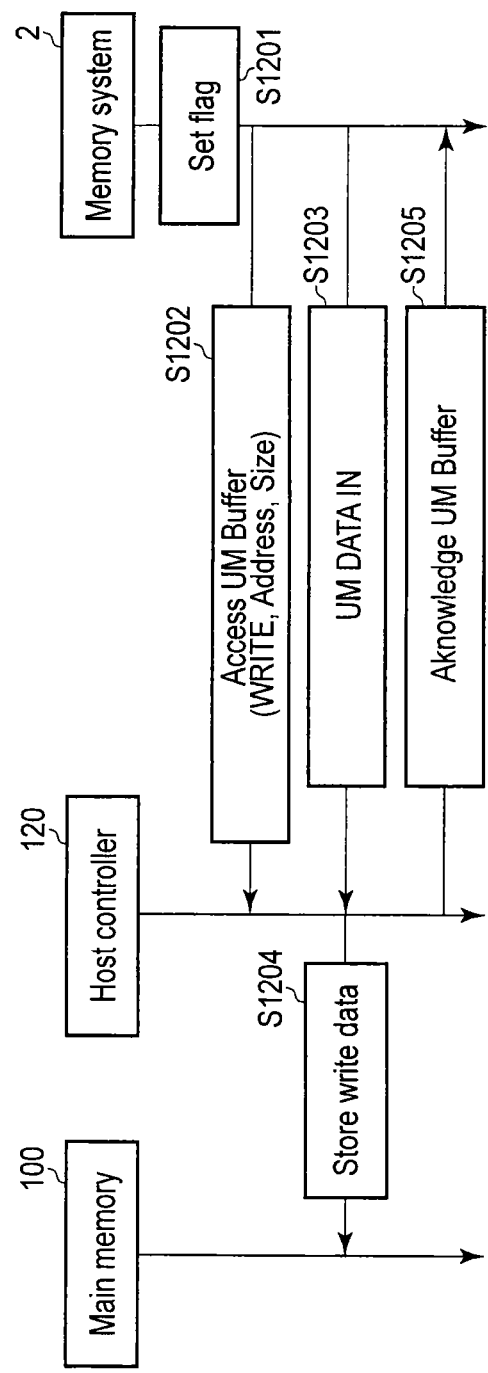
FIG. 11 is a chart showing a data transmission operation of a memory system according to the first embodiment.

An operation example of the information processing device when the memory system 2 writes data in the host device 1 will be described below with reference to FIG. 11. FIG. 11 shows an operation executed when the memory system 2 transmits data.

[Step S1201]

The device controller 200 sets "1" in the flag W in a data transfer command (Access UM Buffer) so as to write data in the host device 1.

[Step S1202]

The device controller 200 transmits a data transfer command (Access UM Buffer) including information [flag W="1", address, and size (WRITE, Address, Size)] to the host device 1. In this case, the data transfer command is a command for writing write data in the device use area 102.

[Step S1203]

The device controller 200 transmits a command (UM DATA IN) for transmitting write data to the host device 1.

Upon reception of the command (Access UM Buffer), which commands to write data, from the memory system 2, the host controller 120 receives write data (UM DATA IN) from the memory system 2 based on the information [flag W="1", address, and size (WRITE, Address, Size)].

[Step S1204]

The host controller 120 stores the write data received from the memory system 2 in the device use area 102.

[Step S1205]

After the write data is stored in the device use area 102, the host controller 120 transmits an acknowledge command (Acknowledge UM Buffer) which means completion to the memory system 2. Thus, the write operation from the memory system 2 to the host device 1 is complete.

<Read Operation>

Figure 12:
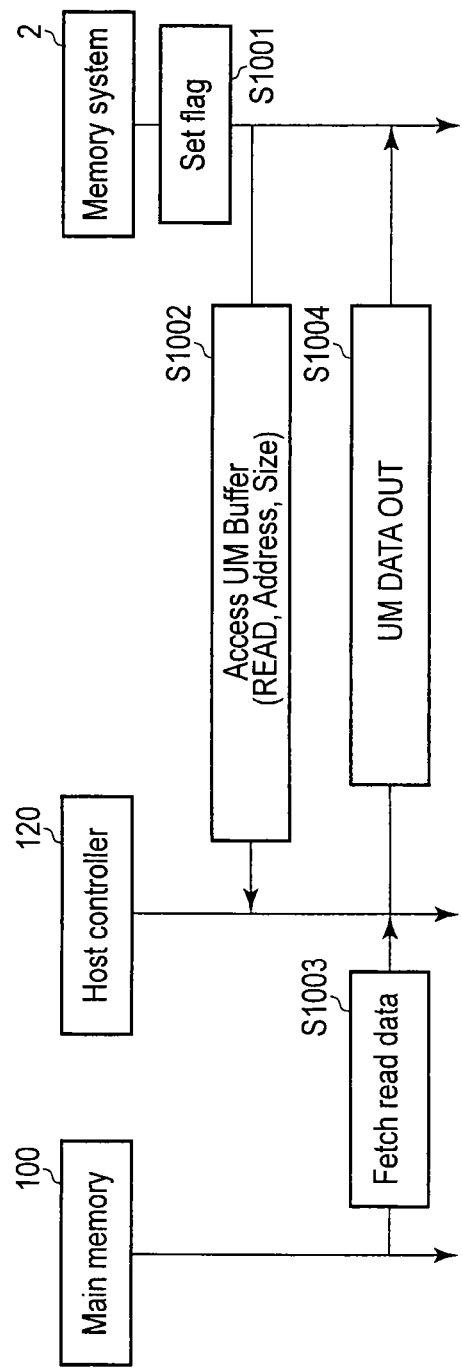
FIG. 12 is a chart showing a data reception operation of the memory system according to the first embodiment.

An operation example of the information processing device when the memory system 2 reads data from the host device 1 will be described below with reference to FIG. 12. FIG. 12 shows an operation executed when the memory system 2 receives data.

[Step S1001]

The device controller 200 sets "1" in the flag R in a data transfer command (Access UM Buffer) so as to read data from the host device 1.

[Step S1002]

The device controller 200 transmits a data transfer command (Access UM Buffer) including information [flag R="1", address, and size (READ, Address, Size)] to the host device 1. In this case, the data transfer command is a command for reading data of the device use area 102.

[Step S1003]

Upon reception of the command (Access UM Buffer), which commands to read data, from the memory system 2, the host controller 120 fetches read data from the device use area 102 based on the information [flag R="1", address, and size (READ, Address, Size)].

[Step S1004]

Then, the host controller 120 transfers the read data to the memory system 2 (UM DATA OUT).

The aforementioned operations (read operation and write operation) may be actively executed by the memory system 2, or may be executed when the memory system 2 receives the write command 500 from the host device 1.

<L2P Table Cache Access>

Figure 13:
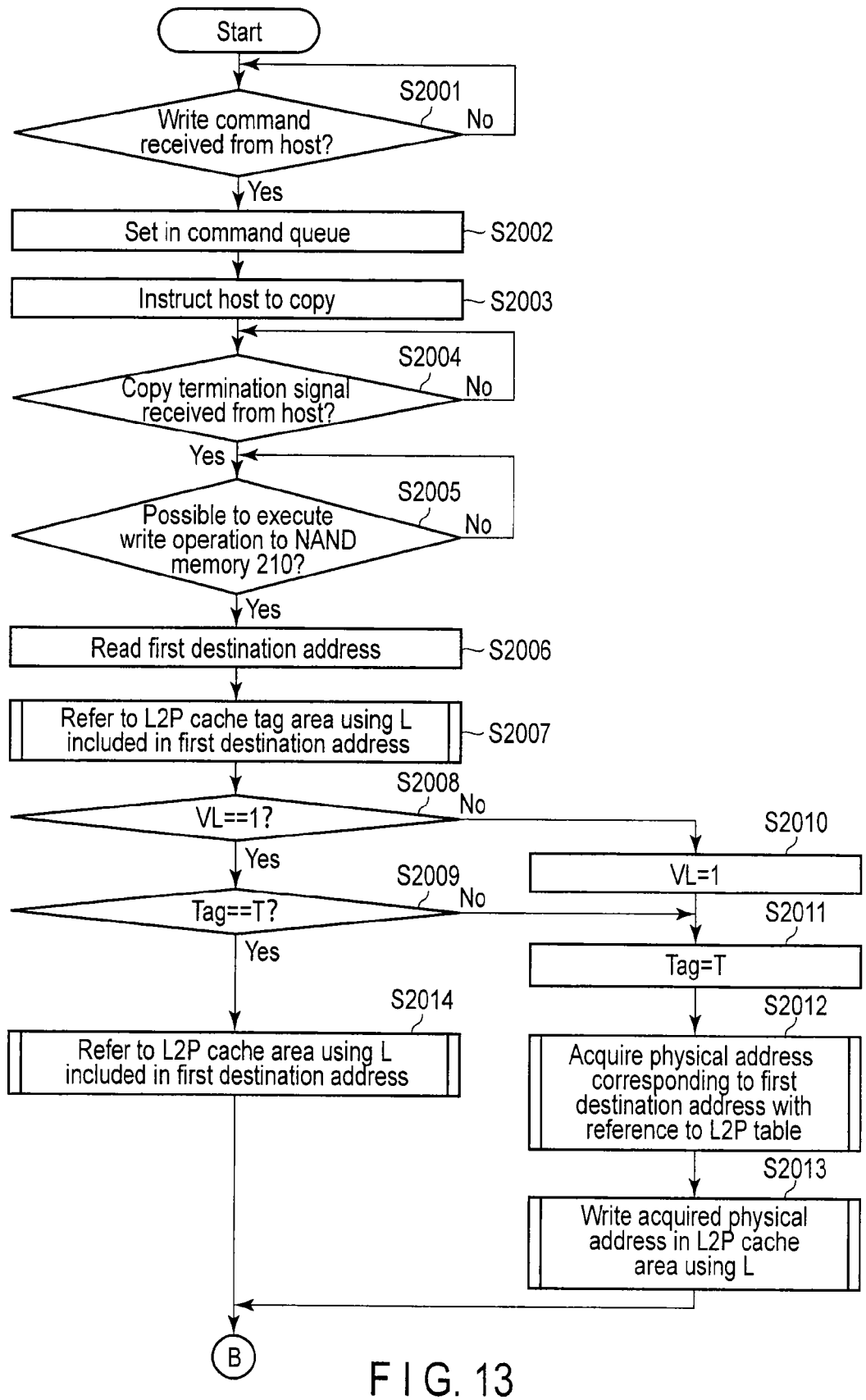
FIGS. 13 and 14 are flowcharts showing the operation of a device controller according to the first embodiment.
Figure 14:
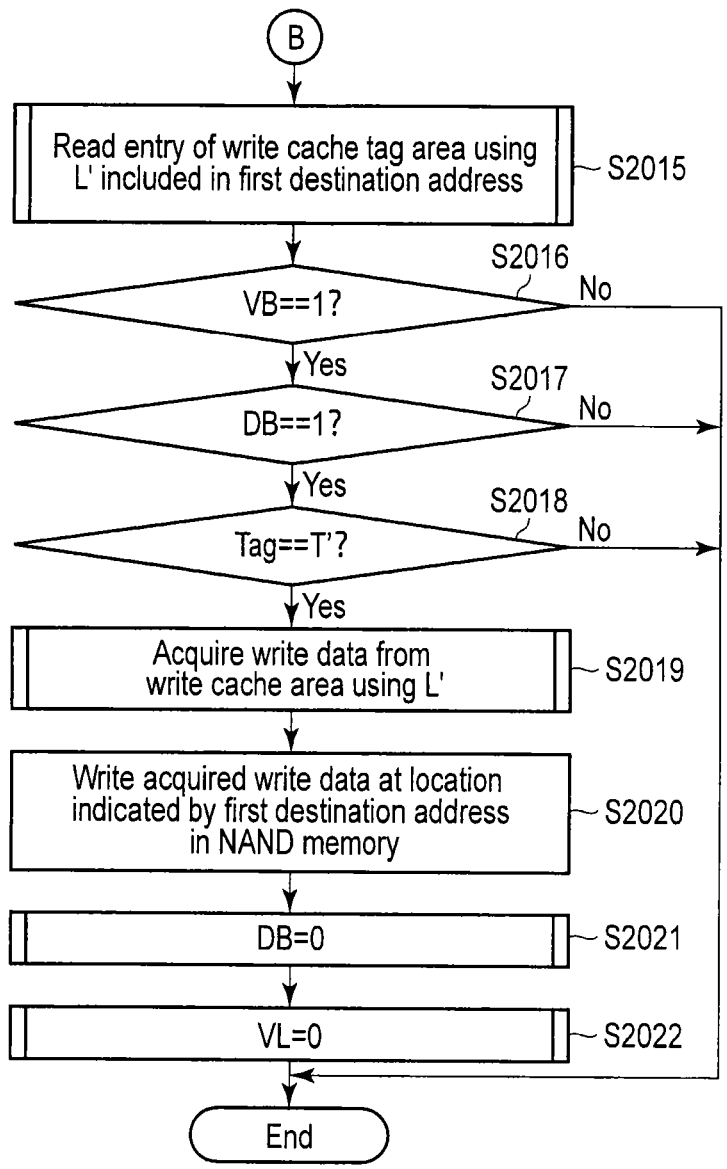

An operation example of the information processing device when the memory system 2 writes a part of the L2P table 211 (L2P table entry) in the host device 1 will be described below with reference to FIGS. 13 and 14. FIGS. 13 and 14 are flowcharts showing an operation executed when the memory system 2 writes an L2P table entry in the main memory 100.

[Step S2001]

The device controller 200 waits for reception of the write command 500 from the host device 1.

[Step S2002]

Upon reception of the write command 500 from the host device 1, the device controller 200 stores the received write command 500 in a command queue. The command queue in step S2002 means that for the memory system 2, which is allocated on the RAM 220.

[Step S2003]

The device controller 200 instructs the host device 1 to execute copy processing of write data.

More specifically, the host controller 120 reads data from an address designated by the source address 502 of the host use area 101, and copies the read data at an address designated by a destination address of the device use area 102 included in the copy processing instruction of the write data from the device controller 200. The main memory DMA 123 notifies the host controller 120 of completion of DMA transfer by a copy termination interrupt.

Upon completion of the DMA transfer by the main memory DMA 123, the host controller 120 commands the control DMA 124 to notify the memory system 2 of copy termination.

[Step S2004]

The device controller 200 waits for reception of a copy termination notification from the host device 1.

[Step S2005]

The device controller 200 determines at a certain timing after reception of the copy termination notification whether or not it is possible to execute a write operation in the NAND memory 210. The certain timing is a timing at which the device controller 200 writes the data copied to the device use area 102 in the NAND memory 210. A state in which it is possible to execute a write operation in the NAND memory 210 means, for example, a state in which a ready/busy signal of the NAND memory 210 indicates "ready". If it is not possible to execute a write operation in the NAND memory 210, the device controller 200 executes the determination processing of this step S2005 again.

[Step S2006]

When it is possible to execute the write operation in the NAND memory 210, the device controller 200 reads the first destination address 503 corresponding to data to be written.

[Step S2007]

The device controller 200 refers to the L2P cache tag area 310 using a 22-bit value L of lower digits of the read first destination address 503.

Figure 15:
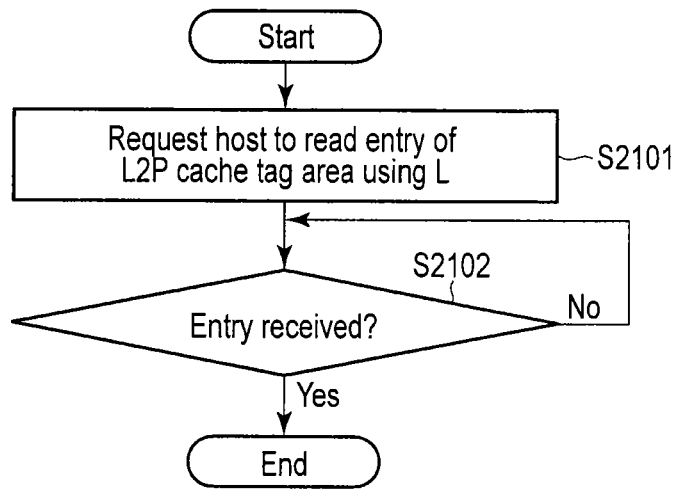
FIG. 15 is a flowchart showing processing executed when the device controller refers to the L2P cache tag area.

The processing of step S2007 will be described in more detail below with reference to FIG. 15. FIG. 15 is a flowchart showing processing of step S2007 executed when the device controller 200 refers to the L2P cache tag area 310.

[Step S2101]

The device controller 200 transmits a read request of an entry (L2P Management Entry) of the L2P cache tag area 310 using L to the host device 1. More specifically, the device controller 200 sets "1" in the flag R in a data transfer command (Access UM Buffer) so as to read an entry (L2P Management Entry) from the host device 1.

The device controller 200 transmits a data transfer command including information [flag R="1", address, and size (READ, L2PTagBaseAddr+L, Size)] to the host device 1. Note that the data transfer command is a command for reading data of the L2P cache tag area 310.

[Step S2102]

The device controller 200 waits for reception of the entry. Upon reception of the command (Access UM Buffer), which commands to read data, from the memory system 2, the host controller 120 fetches the entry (L2P Management Entry) from the L2P cache tag area 310 based on the information [flag R="1", address, and size (READ, L2PTagBaseAddr+L, Size)].

Then, the host controller 120 transfers the read entry (L2P Management Entry) to the memory system 2 based on the command (Access UM Buffer) received from the memory system 2 (UM DATA OUT).

The device controller 200 receives the protected entry. Upon reception of the entry, the device controller 200 decrypts the entry by the protection circuit 230. Then, the device controller 200 stores the decrypted entry in the receive buffer 2204 or 2205. Upon reception of the entry, the device controller 200 ends the processing of step S2007.

[Step S2008]

After the processing of step S2007, the device controller 200 determines whether or not the VL bit included in the entry obtained by the processing of step S2007 is "1".

[Step S2009]

If the VL bit="1", the device controller 200 determines whether or not tag information included in this entry matches a value T of upper 4 bits of the first destination address 503.

[Step S2010]

If it is determined in step S2008 that the VL bit="0", the device controller 200 sets "1" in the VL bit of the entry.

[Step S2011]

If it is determined in step S2009 that the tag information included in the entry does not match the value T of the upper 4 bits of the first destination address 503, or if "1" is set in the VL bit of the entry in step S2010, the device controller 200 sets T as tag information.

[Step S2012]

Subsequently, the device controller 200 refers to the L2P table 211 to acquire a physical address corresponding to the first destination address 503.

[Step S2013]

Then, the device controller 200 writes the physical address acquired in step S2012 in a corresponding cache line in the L2P cache area 300 using L.

Figure 16:
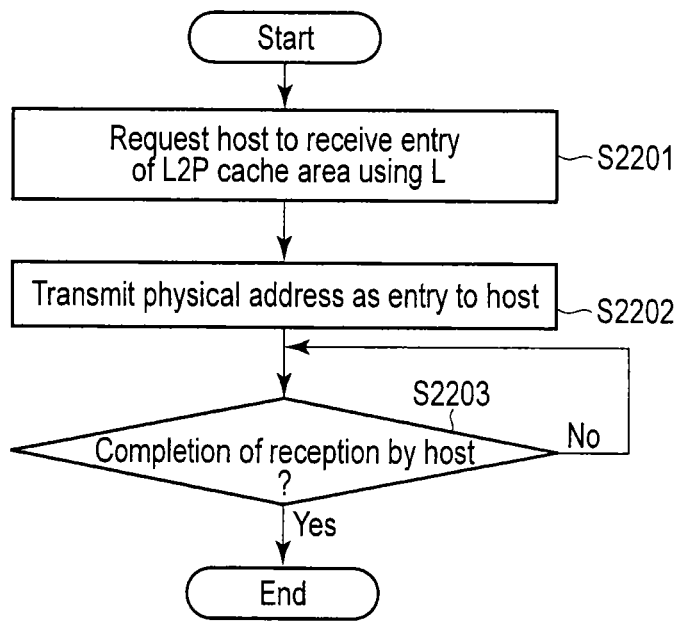
FIG. 16 is a flowchart showing processing executed when the device controller writes a physical address in the L2P cache area.

The processing of step S2013 will be described in more detail below with reference to FIG. 16. FIG. 16 is a flowchart showing processing of step S2013 executed when the device controller 200 writes the physical address in the L2P cache area 300.

[Step S2201]

Initially, the device controller 200 requests the host device 1 to receive an entry (L2P Table Entry) of the L2P cache area 300 using L.

More specifically, the device controller 200 sets "1" in the flag W in a data transfer command (Access UM Buffer) so as to write the entry (L2P Table Entry) in the host device 1.

[Step S2202]

The device controller 200 transmits the physical address acquired in step S2012 to the host device 1 as a transmission target entry (L2P Table Entry).

More specifically, the device controller 200 stores the acquired physical address in the transmit buffer 2202 or 2203. The device controller 200 protects the physical address stored in the transmit buffer 2202 or 2203 by the protection circuit 230. Furthermore, the device controller 200 transmits the protected physical address to the host device 1.

The host controller 120 receives the command (Access UM Buffer), which commands to write data, from the memory system 2. Then, the host controller 120 receives the protected physical address as write data (UM DATA IN) from the memory system 2 based on the information [flag W="1", address, and size (WRITE, Address, Size)]. The host controller 120 then stores the protected physical address received from the memory system 2 in the L2P cache area 300 in the device use area 102.

[Step S2203]

The device controller 200 waits for completion of reception by the host device 1. Upon completion of reception by the host device 1, the device controller 200 ends the processing of step S2013.

[Step S2014]

If tag information of the entry read by the processing of step S2007 is equal to T, the device controller 200 acquires the entry (L2P Table Entry) from the L2P cache area 300.

The processing of step S2014 will be described in more detail below with reference to FIG. 17. FIG. 17 is a flowchart showing processing of step S2014 executed when the device controller 200 refers to the L2P cache area 300.

[Step S2301]

The device controller 200 transmits a read request of the entry (L2P Table Entry) of the L2P cache area 300 using L to the host device 1.

Also, the device controller 200 sets "1" in the flag R in a data transfer command (Access UM Buffer) so as to read the entry (L2P Table Entry) from the host device 1.

The device controller 200 transmits a data transfer command (Access UM Buffer) including information [flag R="1", address, and size (READ, L2PBaseAddr+L×4, Size)] to the host device 1. In this case, the data transfer command is a command for reading data of the L2P cache area 300.

[Step S2302]

The device controller 200 waits for reception of the entry. Upon reception of the command (Access UM Buffer), which commands to read data, from the memory system 2, the host controller 120 fetches the entry (L2P Table Entry) from the L2P cache area 300 based on the information [flag R="1", address, and size (READ, L2PBaseAddr+L×4, Size)].

Then, the host controller 120 transfers the read entry (L2P Table Entry) to the memory system 2 (UM DATA OUT) based on the command (Access UM Buffer) received from the memory system 2.

The device controller 200 receives the protected entry. Upon reception of the entry, the device controller 200 decrypts the entry by the protection circuit 230. Then, the device controller 200 stores the decrypted entry in the receive buffer 2204 or 2205, thus ending the processing of step S2014.

[Step S2015]

After the processing of step S2013 or S2014, the device controller 200 reads an entry of the write cache tag area 410 using a value L' of lower 13 bits of the first destination address 503.

The processing of step S2015 will be described in more detail below with reference to FIG. 18. FIG. 18 is a flowchart showing processing of step S2015 executed when the device controller 200 reads the entry of the write cache tag area 410.

[Step S2401]

The device controller 200 requests the host device 1 for the entry of the write cache tag area 410 using the value L' of the lower 13 bits of the first destination address 503.

Also, the device controller 200 sets "1" in the flag R in a data transfer command (Access UM Buffer) so as to read the entry (Buffer Management Entry) from the host device 1.

The device controller 200 transmits a data transfer command (Access UM Buffer) including information [flag R="1", address, and size (READ, WCTagBaseAddr+L'*2, Size)] to the host device 1. In this case, the data transfer command is a command for reading data of the write cache tag area 410.

[Step S2402]

The device controller 200 waits for reception of the entry. Upon reception of the command (Access UM Buffer), which commands to read data, from the memory system 2, the host controller 120 fetches the entry (Buffer Management Entry) from the write cache tag area 410 based on the information [flag R="1", address, and size (READ, WCTagBaseAddr+L'*2, Size)].

Then, the host controller 120 transfers the read entry (Buffer Management Entry) to the memory system 2 (UM DATA OUT). The device controller 200 receives the protected entry. Upon reception of the entry, the device controller 200 decrypts the entry by the protection circuit 230. Then, the device controller 200 stores the decrypted entry in the receive buffer 2204 or 2205. Upon reception of the entry, the device controller 200 ends the processing of step S2015.

[Step S2016]

After the processing of step S2015, the device controller 200 determines whether or not the VB bit included in the read entry is "1".

[Step S2017]

If the VB bit="1", the device controller 200 determines whether or not the DB bit included in the entry is "1".

[Step S2018]

If the DB bit="1", the device controller 200 determines whether or not tag information included in the entry matches T'.

If the VB bit="0", the DB bit="0", or the tag information does not match T', the device controller 200 ends the operation.

[Step S2019]

If the tag information included in the entry matches T' in step S2018, it is settled that write data as a write target is stored in the write cache area 400. In this case, the device controller 200 acquires the write data from a cache line of the write cache area 400 using L'.

Figure 19:
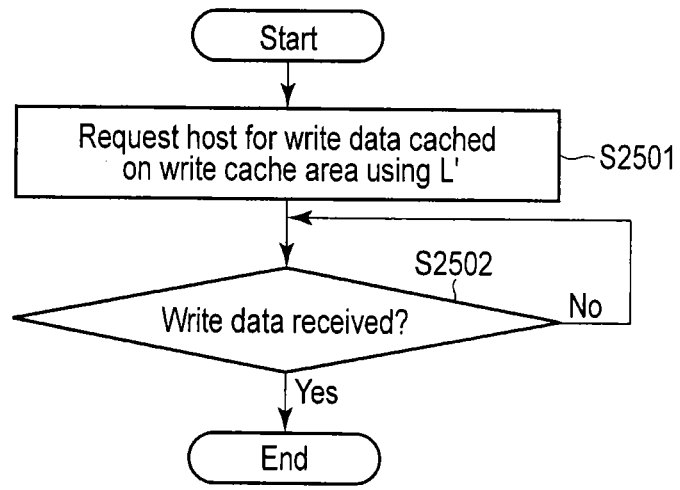
FIG. 19 is a flowchart showing processing executed when the device controller acquires write data from a host device.

The processing of step S2019 will be described in detail below with reference to FIG. 19. FIG. 19 is a flowchart showing processing of step S2019 executed when the device controller 200 acquires write data from the host device 1.

[Step S2501]

The device controller 200 requests the host device 1 to transfer write data cached in the write cache area 400 using L'.

The device controller 200 sets "1" in the flag R in a data transfer command (Access UM Buffer) so as to read an entry (Write Buffer Entry) from the host device 1.

The device controller 200 transmits a data transfer command (Access UM Buffer) including information [flag R="1", address, and size (READ, WCBaseAddr+L'×4K, Size)] to the host device 1. In this case, the data transfer command is a command for reading data of the write cache area 400.

[Step S2502]

The device controller 200 waits for reception of the write data. Upon reception of the command (Access UM Buffer), which commands to read data, from the memory system 2, the host controller 120 fetches the entry (Write Buffer Entry) from the write cache area 400 based on the information [flag R="1", address, and size (READ, WCBaseAddr+L'×4K, Size)].

Then, the host controller 120 transfers the read entry (Write Buffer Entry) to the memory system 2 (UM DATA OUT).

The device controller 200 receives the entry. Upon reception of the entry, the device controller 200 stores the entry in the receive buffer 2204 or 2205 without decrypting the entry by the protection circuit 230. Upon reception of the entry, the device controller 200 ends the processing of step S2019.

[Step S2020]

After the processing of step S2019, the device controller 200 writes the acquired write data at a location indicated by the physical address in the NAND memory 210, which address is acquired in step S2012 or S2014.

[Step S2021]

Then, the device controller 200 sets "0" in the DB bit of the entry of the write cache tag area 410, which is referred to by the processing of step S2015.

Figure 20:
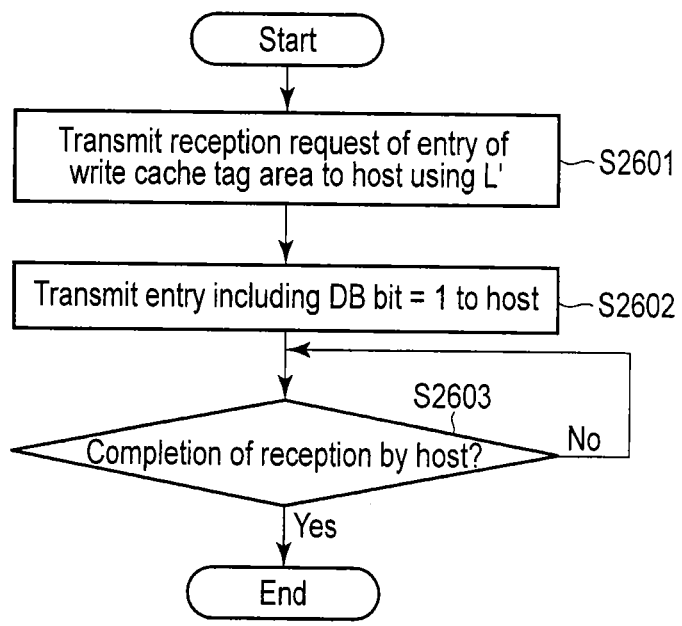
FIG. 20 is a flowchart showing processing executed when the device controller manipulates a DB bit value.

The processing of step S2021 will be described in detail below with reference to FIG. 20. FIG. 20 is a flowchart showing processing of step S2021 executed when the device controller 200 manipulates a value of the DB bit.

[Step S2601]

The device controller 200 transmits a reception request of the entry of the write cache tag area 410 to the host device 1 using L'.

[Step S2602]

The device controller 200 transmits the entry including the DB bit="1" to the host device 1.

[Step S2603]

After that, the device controller 200 waits until the host device 1 completes reception by monitoring status information to be received.

Upon completion of reception of the entry by the host device 1, the device controller 200 ends the operation of step S2021.

[Step S2022]

After the processing of step S2021, the device controller 200 sets "0" in the VL bit of the entry of the L2P cache tag area 310, which is referred to by the processing of step S2007, thus ending the operation.

Figure 21:
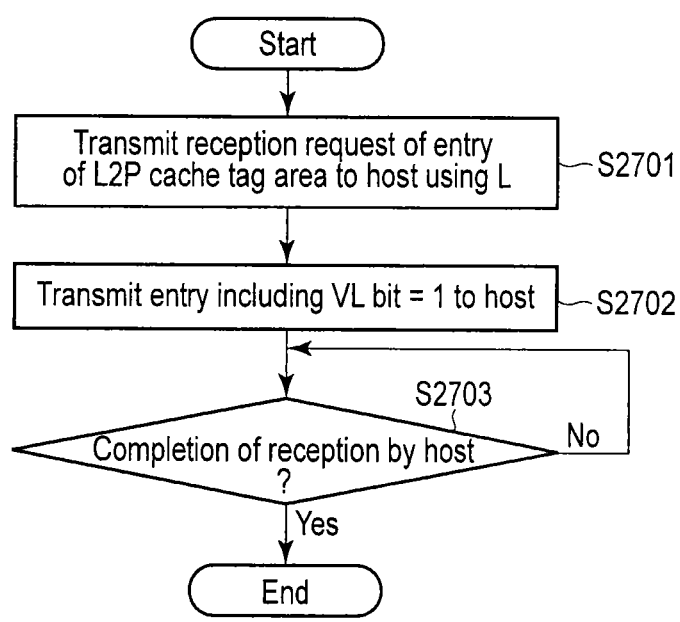
FIG. 21 is a flowchart showing processing executed when the device controller manipulates a VL bit value.

The processing of step S2022 will be described in more detail below with reference to FIG. 21. FIG. 21 is a flowchart showing processing of step S2022 executed when the device controller 200 manipulates a VL bit value.

[Step S2701]

The device controller 200 transmits a reception request of the entry of the L2P cache tag area 310 to the host device 1 using L.

[Step S2702]

The device controller 200 transmits the entry including the VL bit="1" to the host device 1.

[Step S2703]

After that, the device controller 200 waits until the host device 1 completes reception by monitoring status information to be received.

Upon completion of reception of the entry by the host device 1, the device controller 200 ends the operation of step S2022.

<Effects in Information Processing Device of First Embodiment>

In the aforementioned first embodiment, when data is transferred between the host device 1 and memory system 2, whether or not to protect (for example, to apply encryption or scramble processing to) data to be transferred by the protection circuit is controlled by the control program (for example, firmware). For example, upon transferring data, whether or not to protect the transfer data by the protection circuit is switched according to the storage capacity (buffer size) of the buffer which temporarily holds the transfer data.

Thus, the need for determination as to whether or not to protect data can be obviated in the memory system, and a load required for control can be reduced, thus preventing a data transfer speed from lowering. Note that whether or not to protect data to be transferred by the protection circuit may be switched according to a size or type of the transfer data. In these cases, the same effects as in the above description can be obtained.

Second Embodiment

An information processing device according to a second embodiment will be described below. Note that the basic arrangement and basic operation of the information processing device according to the second embodiment are the same as those of the information processing device according to the aforementioned first embodiment. Therefore, a description about the items which have been explained in the aforementioned first embodiment and those which can be easily analogized from the first embodiment will not be given.

Figure 22:
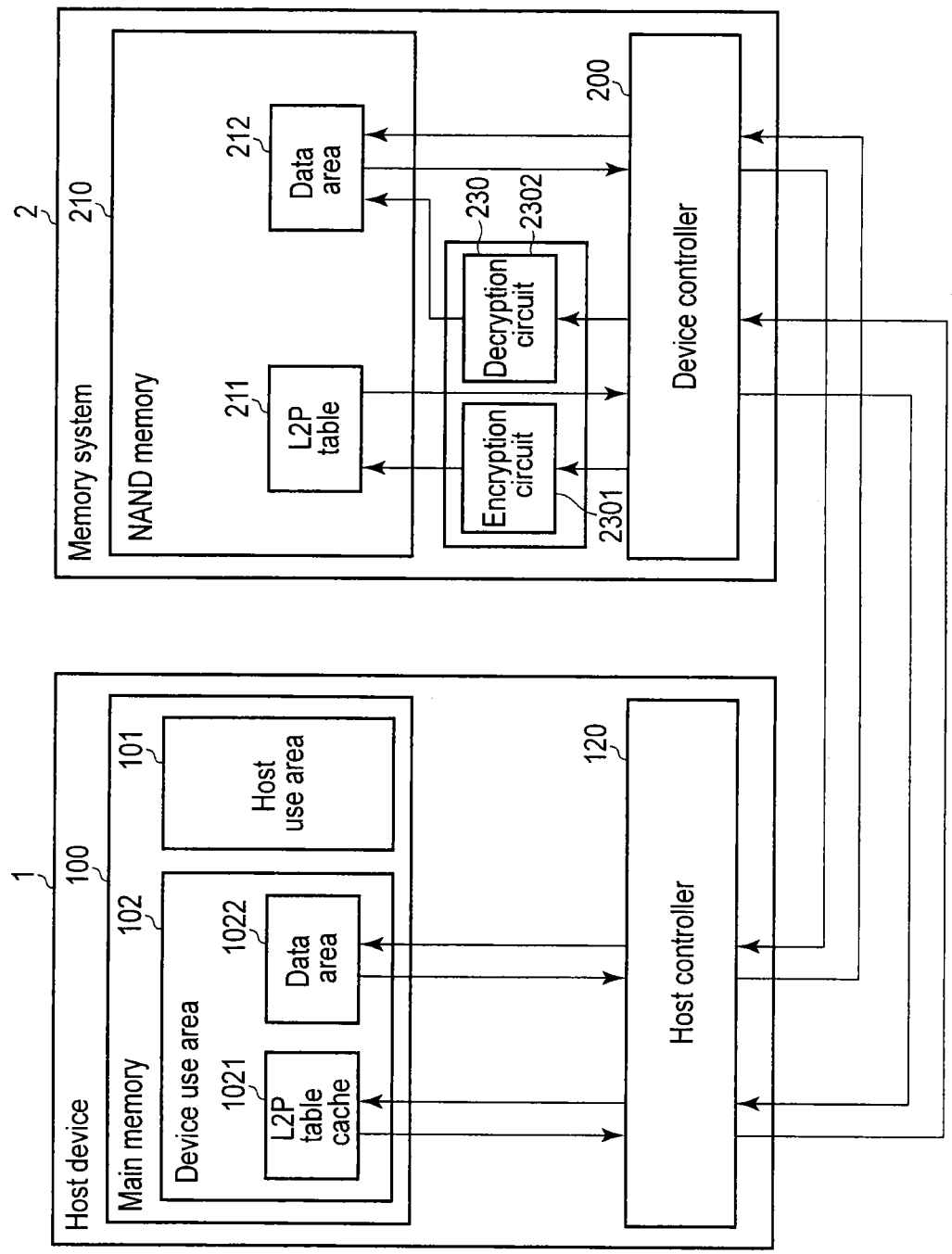
FIG. 22 is a block diagram showing a principal arrangement of an information processing device according to a second embodiment.

FIG. 22 is a block diagram showing a principal arrangement of an information processing device according to the second embodiment.

As shown in FIG. 22, the information processing device of the second embodiment includes a host device 1 and memory system 2.

The memory system 2 includes a nonvolatile semiconductor memory, for example, a NAND flash memory 210, a device controller 200, and a protection circuit 230.

The NAND memory 210 has an L2P table 211 and a data area 212. The L2P table 211 is a table which associates logical addresses and physical addresses with each other so as to convert logical addresses into physical addresses. The data area 212 stores user data transmitted from the host device 1.

The protection circuit 230 includes an encryption circuit 2301 and decryption circuit 2302. The encryption circuit 2301 encrypts an L2P table entry supplied from the device controller 200, and outputs the encrypted entry to the L2P table 211. The decryption circuit 2302 decrypts (descrambles) the encrypted L2P table entry, which is read from an L2P table cache 1021 of a main memory 100, and outputs the decrypted entry to the data area 212.

The host device 1 includes the main memory 100 and a host controller 120. The main memory 100 includes a host use area 101 and device use area 102. The host controller 120 controls the operation of the main memory 100, and also controls data transfer between itself and the memory system 2.

The device use area 102 includes the L2P table cache 1021 and a data area 1022. The L2P table cache 1021 stores a part of the L2P table 211 (L2P table entry). The data area 1022 is used as a cache area for read/write accesses.

Figure 25:
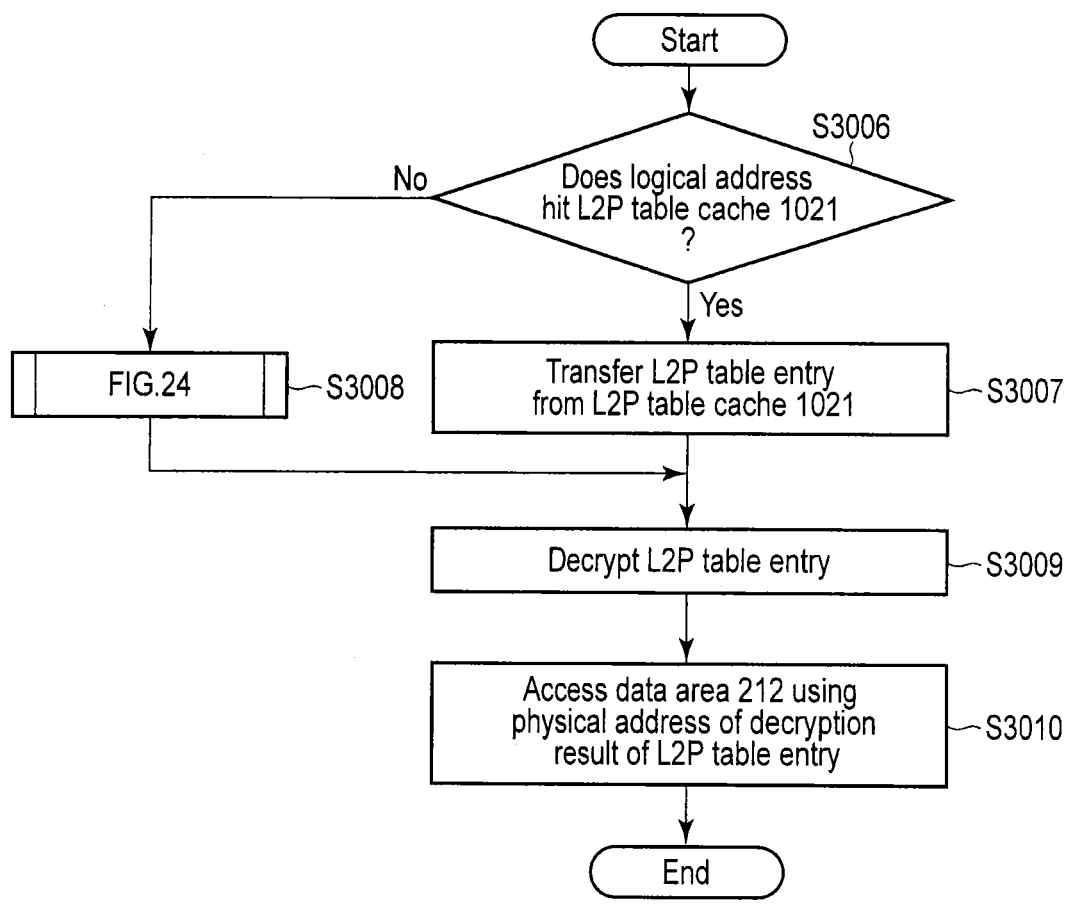

The operation of the information processing device according to the second embodiment will be described below with reference to FIGS. 22, 23, 24, and 25. FIGS. 23, 24, and 25 are flowcharts showing the operation of the information processing device according to the second embodiment.

FIG. 23 shows generation of the L2P table.

[Step S3001]

Generation of the L2P table occurs when data is stored in a new area in the data area 212 of the NAND memory 210.

[Step S3002]

The device controller 200 outputs a generated L2P table entry to the encryption circuit 2301. The L2P table entry input to the encryption circuit 2301 is encrypted (scrambled) by the encryption circuit 2301, and is then output to the NAND memory 210.

[Step S3003]

The encrypted L2P table entry is stored in the L2P table 211 in the NAND memory 210. The L2P table entry is address conversion information which associates a physical address and logical address with each other, as described above.

FIG. 24 shows caching of the L2P table.

[Step S3004]

In order to speed up accesses to the L2P table, the device controller 200 reads a required L2P table entry from the L2P table 211, and transfers the read entry to the host device 1.

[Step S3005]

The L2P table entry transferred to the host device 1 is stored in the L2P table cache 1021 in the device use area 102 of the main memory 100. Note that the L2P table entry stored in the L2P table cache 1021 is encrypted by the encryption circuit 2301, as described above.

FIG. 25 shows a use situation of the L2P table.

[Step S3006]

It is determined upon accessing the NAND memory 210 whether or not an access target logical address hits an L2P table entry in the L2P table cache 1021.

[Step S3007]

If the logical address hits the L2P table entry in the L2P table cache 1021, that L2P table entry is read from the L2P table cache 1021, and is transferred to the memory system 2.

[Step S3008]

On the other hand, if the logical address does not hit any L2P table entry in the L2P table cache 1021, the processing shown in FIG. 24 is executed to read an L2P table entry from the L2P table 211. The read L2P table entry is transferred to the host device 1, and is stored in the L2P table cache 1021 in preparation for the next use.

[Step S3009]

After the processing of step S3007 or S3008, the device controller 200 inputs the L2P table entry to the decryption circuit 2302. The L2P table entry input to the decryption circuit 2302 is decrypted (or descrambled) by the decryption circuit 2302, and is then output to the NAND memory 210. The decryption result is a physical address of the NAND memory.

[Step S3010]

Using the physical address, the data area 212 in the NAND memory 210 is accessed.

In the aforementioned second embodiment, when an L2P table entry is registered in the L2P table 211, the L2P table entry is encrypted, and is then stored in the L2P table 211. After that, when the L2P table entry is used, the encrypted L2P table entry is decrypted to access the data area 212.

According to the aforementioned processing, since a write access speed to the NAND memory 210 upon registration of an L2P table entry is originally not so high, even when processing for encrypting the L2P table entry is added, the influence on a transfer speed is small. Furthermore, since an L2P table entry is registered not so frequently, the influence is also small in terms of this point.

More specifically, an L2P table entry is preferably encrypted and registered at timings of the following operations. That is, the L2P table entry is preferably encrypted and registered when a new file is written in the NAND memory 210, when a file is moved in the NAND memory 210 (for example, at an execution timing of wear leveling, when a defective block is detected, and a file is moved from that defective block), and so forth.

The effect of the second embodiment will be described below.

When data is transferred from the memory system to the host device, if the data is protected by the protection circuit, and that data is then transferred, the data transfer speed may often lower. On the other hand, when data is transferred from the host device to the memory system, since a data write speed to the memory device is low, even when the protection circuit is added, the influence of that protection circuit on the transfer speed is small.

Hence, in the second embodiment, in such asymmetric data transfer speed system, protected data is stored in advance in the memory device, and when data is read from the memory device and is transferred, that data is transferred to the host device without the intervention of the protection circuit. That is, when data is written in the memory device, the data is protected, and the protected data is written. When data is read from the memory device and is transferred, the read data is transferred intact. Thus, data can be protected while preventing the data transfer speed from lowering.

This embodiment has explained the protection example of the L2P table, but it is not limited to this. This embodiment is applicable to protection of management information other than the L2P table.

The aforementioned embodiments have been explained using the UFS memory device, but they are not limited to this. For example, these embodiments are applicable to arbitrary memory systems based on a client-server model.

Furthermore, the aforementioned embodiments have been explained using the UFS memory device, but they are applicable to any other semiconductor storage devices such as other memory cards, memory devices, or internal memories as long as they execute the same operation, thus providing the same effects as in the aforementioned first and second embodiment. The above embodiments are not limited to the NAND flash memory 210, and are applicable to other semiconductor memories.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:

a host device comprising a first memory unit which stores data, and a host controller which controls input/output accesses of data with respect to the first memory unit; and a memory device comprising a nonvolatile semiconductor memory which stores data, a second memory unit which temporarily stores data to be transferred between the first memory unit and the nonvolatile semiconductor memory, a protection circuit which protects data to be transferred from the second memory unit to the first memory unit by converting the data into an incomprehensible format for a third party, and a device controller which switches according to a control program whether or not to protect the data by the protection circuit, wherein the second memory unit comprises a plurality of buffers having different storage capacities, and the device controller switches whether or not to protect the data by the protection circuit according to the storage capacities of the buffers.

2. The information processing device according to claim 1, wherein the device controller further switches whether or not to protect the data by the protection circuit according to a size of data stored in the buffer.

3. The information processing device according to claim 1, wherein the protection circuit executes one of encryption processing and scramble processing of the data to be transferred from the second memory unit to the first memory unit.

4. The information processing device according to claim 1, wherein the protection circuit decrypts data transferred from the first memory unit to the second memory unit.

5. The information processing device according to claim 4, wherein the device controller switches whether or not to decrypt the data by the protection circuit according to a size of the data to be transferred from the first memory unit to the second memory unit.

6. The information processing device according to claim 4, wherein when the data transferred from the first memory unit is protected data, the device controller decrypts the data by the protection circuit.

7. The information processing device according to claim 1, wherein when the data transferred from the first memory unit is data which is not protected, the device controller stores the data in the second memory unit without decrypting the data by the protection circuit.

8. The information processing device according to claim 1, wherein when data stored in the second memory unit includes table information which associates a logical address and a physical address with each other, the device controller protects the table information by the protection circuit.

9. The information processing device according to claim 1, wherein when data stored in the second memory unit includes information used by a user, the device controller transfers the data to the first memory unit without protecting the data by the protection circuit.

10. The information processing device according to claim 1, wherein the data has a header and a payload, the payload is a data part of the data, and the header defines a feature of the data part, and
the protection circuit protects the payload.

11. The information processing device according to claim 1, wherein data to be transferred between the first memory unit and the second memory unit includes table information which associates a logical address and a physical address with each other.

12. The information processing device according to claim 1, wherein the control program includes firmware stored in the memory device.

13. The information processing device according to claim 1, wherein the memory device uses the first memory unit as a working memory area.

14. An information processing device comprising:
a host device comprising
a first memory unit which stores data, and
a host controller which controls input/output accesses of data with respect to the first memory unit; and
a memory device comprising
a nonvolatile semiconductor memory which stores data,
a second memory unit which temporarily stores data to be transferred between the first memory unit and the nonvolatile semiconductor memory,
a protection circuit which protects data to be transferred from the second memory unit to the first memory unit by converting the data into an incomprehensible format for a third party, and
a device controller which switches according to a control program whether or not to protect the data by the protection circuit,
wherein the second memory unit comprises a plurality of buffers having different storage capacities, and
the device controller switches whether or not to protect the data by the protection circuit according to a size of data stored in the buffer.

15. The information processing device according to claim 14, wherein the protection circuit executes one of encryption processing and scramble processing of the data to be transferred from the second memory unit to the first memory unit.

16. The information processing device according to claim 14, wherein the protection circuit decrypts data transferred from the first memory unit to the second memory unit.

17. The information processing device according to claim 16, wherein the device controller further switches whether or not to decrypt the data by the protection circuit according to a size of the data to be transferred from the first memory unit to the second memory unit.

18. The information processing device according to claim 16, wherein when the data transferred from the first memory unit is protected data, the device controller decrypts the data by the protection circuit.

19. The information processing device according to claim 14, wherein when the data transferred from the first memory unit is data which is not protected, the device controller stores the data in the second memory unit without decrypting the data by the protection circuit.

20. The information processing device according to claim 14, wherein when data stored in the second memory unit includes table information which associates a logical address and a physical address with each other, the device controller protects the table information by the protection circuit.

* * * * *